Feb. 1, 1966  R. W. KILBURN  3,232,859
MULTI-CELL ASSEMBLY FOR ELECTRODIALYSIS
Filed Dec. 22, 1961  3 Sheets-Sheet 1

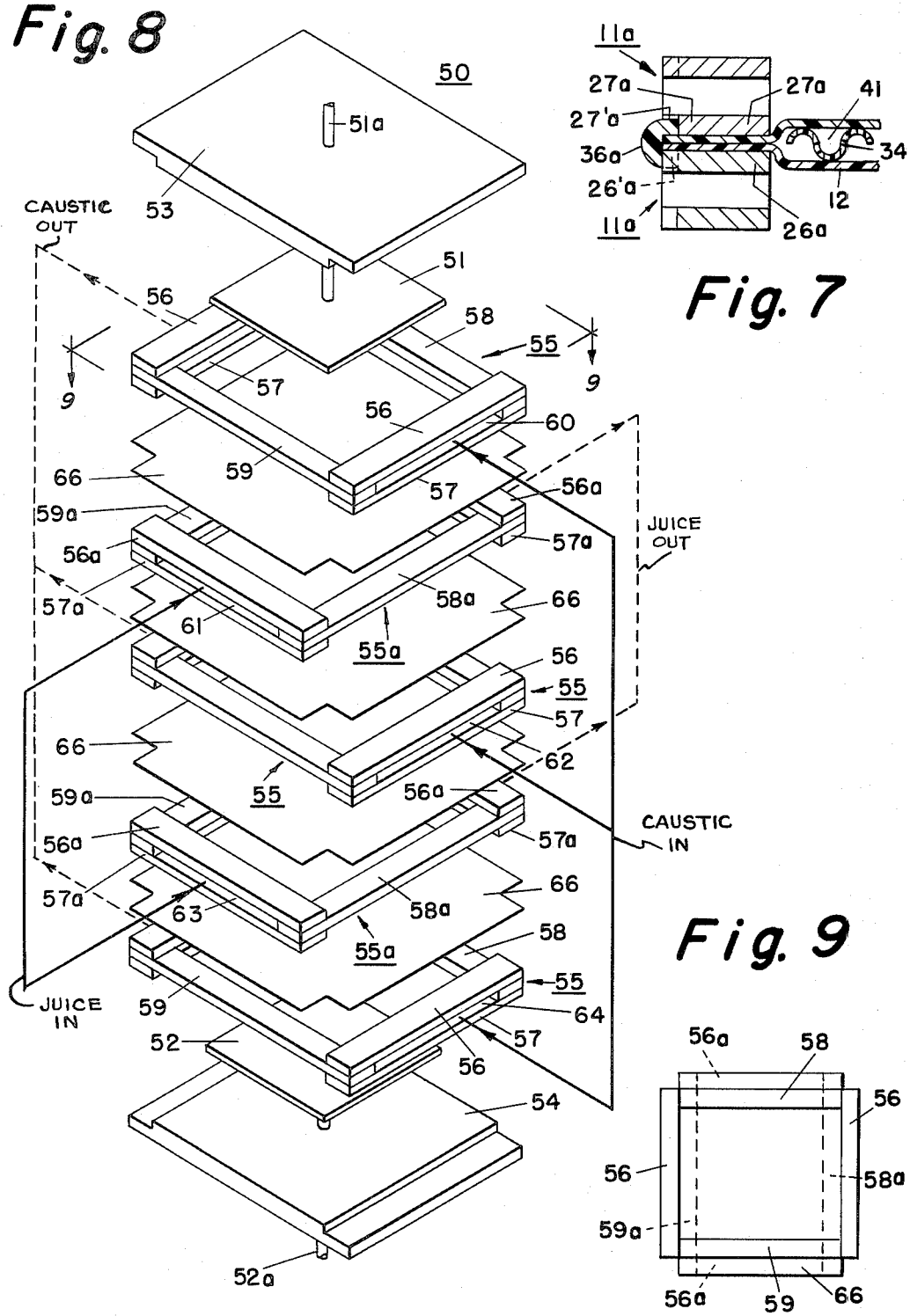
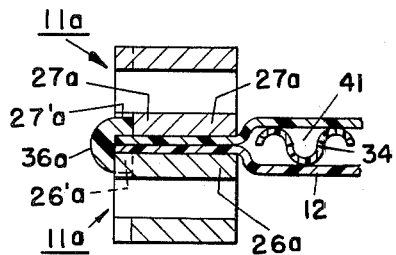
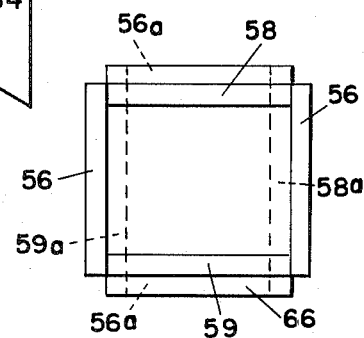

United States Patent Office 3,232,859
Patented Feb. 1, 1966

3,232,859
MULTI-CELL ASSEMBLY FOR ELECTRODIALYSIS
Robert W. Kilburn, Lake Wales, Fla., assignor, by mesne assignments, to American Machine & Foundry Company, a corporation of New Jersey
Filed Dec. 22, 1961, Ser. No. 161,525
13 Claims. (Cl. 204—301)

This invention relates to multi-cell assemblies for electrodialysis or the like and has for an object the provision of an improved multi-cell assembly comprising a plurality of nesting cell frames separated by membranes with the cell frames being so constructed and arranged as to prevent leakage between adjacent cells and to provide openings at the oposite ends of each cell corresponding in area substantially to the cross-sectional area of each cell for ease of inspection and cleaning.

Electrodialysis cell assemblies are made up of a plurality of cells or compartments each separated from the other by membranes. While the present invention is applicable to dialysis cells of various types, it is particularly applicable to electrodialysis cells which utilize electrodes disposed in compartments at the opposite ends of the multi-cell assembly. In order to reduce the electrical resistance between cells as far as possible so as to minimize the overall electrical resistance between the electrodes, it is necessary to make each compartment or cell very narrow, thus bringing adjacent membranes close together. By making the cells or compartments very narrow, there is created a problem of providing the cells with inlets and outlets of such construction so as to facilitate inspection and cleaning. This is particularly true when the cells are used for processing fluids containing insoluble solids in suspension. One example is the processing of liquid food products, such for example, as the process of improving the taste of fruit juice by a dialysis as disclosed in my copending application, Serial No. 60,495, filed October 4, 1960, now Patent No. 3,165,415 granted January 12, 1965. In working with liquid food products, it is necessary that the multi-cell electrodialysis apparatus frequently be inspected and cleaned in order to avoid spoilage or contamination of the liquid food product. The problem arises in the deposition of insoluble solids on the surfaces of the equipment. In the usual dialysis stack design where small passages connect the manifold with the cell, this can lead to complete stoppage of flow. While the invention is particularly suited for use with liquid food products, its use is not limited thereto. For example by reason of its large openings between the manifold and the cell, it is also applicable to aqueous slurries containing insoluble material in suspension such as mineral ore processing where the powdered ore is mixed with aqueous extracting fluid. It also may be used for the removal of electrolytes from solutions, such as for example, the separation or concentration of fluids by dialysis or electrodialysis including the preparation of drinking water, water for industry, irrigation water for crops and the like from brackish water, and industrial waste treatment.

The present invention provides a multi-cell assembly having a simple yet rugged frame construction in which the individual frame members including integral spacers comprise identical construction units which are assembled in interlocking and nesting relation so as to prevent leakage between adjacent cells and at the same time to provide inlet and outlet openings from the respective cells which have an area corresponding to the cross-sectional area of each cell, thus providing maximum area access openings to each cell. This novel construction permits inspection of the entire cell area from one end to the other and thus minimizes sanitation problems.

The large openings between manifold and cells permitting inspection and cleaning when the manifold is removed makes it unnecessary to dismantle the dialysis stack as is the common practice with usual stack designs. Elimination of the need for frequent dismantling of the stack makes it possible to eliminate permanently all potential leaks between fluid systems, for example, between juice and caustic. All potential leaks are sealed by welding or cementing the frame structure together. Perm-selective membranes cannot be cemented, welded or sealed to each other or to any other material. Sealing the system has to be accomplished through construction of the frames of the stack. The usual method for reducing leakage is to gasket with flexible material between frames and compress the stack in a press. Welding, sealing or cementing the frame structure as disclosed in the present invention permanently eliminates leakage. This is particularly important in processing foods to prevent contamination of the foods.

More specifically, and in accordance with the present invention, there is provided a multi-cell assembly for electrodialysis or the like including a plurality of nesting cell frames separated by membranes and arranged to define a central membrane area. Each of the frames includes two pairs of side strips disposed on opposite sides of each of the frames. The side strips in each of the cells are parallel to each other and maintained in predetermined spaced relation by spacer members disposed between the ends of each of the pairs of side strips so as to define a rectangular cell opening. The spacer members in each frame extend outwardly of the ends of the corresponding pairs of side strips. The pairs of side strips and spacers in each alternate frame in the assembly are in direct alignment and are turned through an angle of 90° with respect to each adjacent frame in the multi-cell assembly. Each of the spacer members has a thickness twice the thickness of each of the side strips so that when the frames and membranes are assembled the spacers in adjacent frames will clamp a membrane therebetween and the side strips in alternate frames will clamp two membranes therebetween whereby the rectangular cell openings to each frame have substantially the same area as the cross-sectional area of each of the cells of the multi-cell assembly.

Further in acordance with the invention the frames of the multi-cell assembly are made from plastic and the side strips of the frame which clamp the membranes therebetween are adapted to be sealed to each other. The side strips preferably are provided with alternately-spaced notches to receive the edges of the membranes and the edges of the side strips preferably are sealed together as by welding.

Further in accordance with the invention separator members are provided in alternate cells of the assembly to maintain the membranes in spaced relation one from the other while the remaining cells of the assembly have their respective membranes maintained apart by hydraulic pressure.

For further objects and advantages of the invention and a more detailed disclosure thereof, reference is to be had to the following description taken in conjunction with the accompanying drawings in which:

FIG. 7 is an enlarged fractional view showing a section taken along the plane 7—7 in FIG. 3;

FIG. 8 is an exploded isometric view showing a modification of the multi-cell assembly embodying the present invention; and FIG. 9 is a sectional view taken along the plane 9—9 in FIG. 8.

Figure 1:
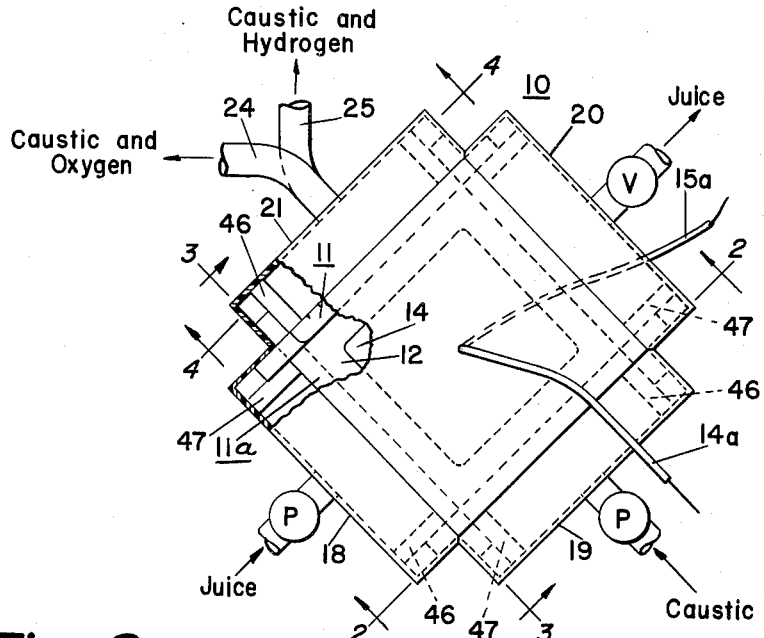
FIG. 1 is an elevation view partly in section showing an electrodialysis multi-cell assembly embodying the present invention.

Referring to FIG. 1, the present invention has been illustrated in connected with a multi-cell assembly for processing fruit juice by electrodialysis, in accordance with the method disclosed in my aforementioned copending application, Serial No. 60,495. The multi-cell assembly 10 includes a plurality of nesting and interlocking frames 11 and 11a of novel construction, as later to be described in detail, separated by membranes 12 made of a plastic material or film, such as polyethylene or polyvinyl chloride sheets or the like. These membranes may be of the ion selective type made in a manner well-known in the art. Examples of ion-permeable membranes which are particularly suitable for use in the process of improving the taste of fruit juice are disclosed in my aforesaid copending application and in Belgian Patents 537,438 and 568,-266. However, it is to be understood that the present invention is not limited to these particular membranes.

Figure 2:
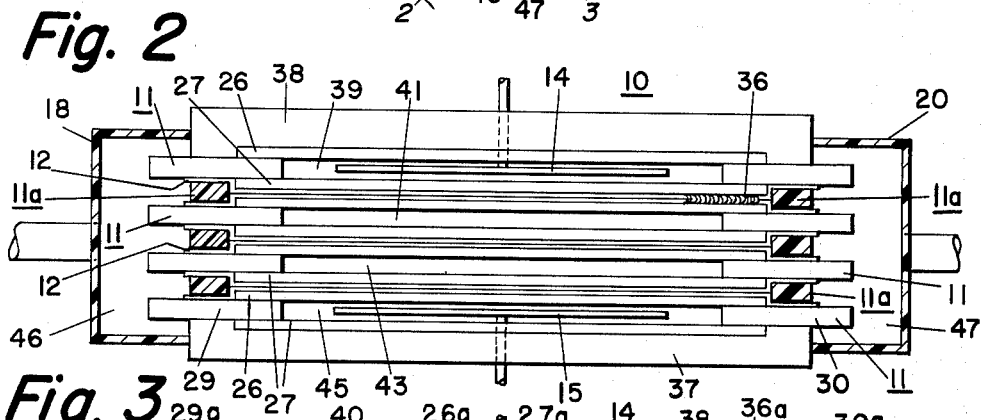
FIG. 2 is a view taken along the plane 2—2 in FIG. 1.
Figure 3:
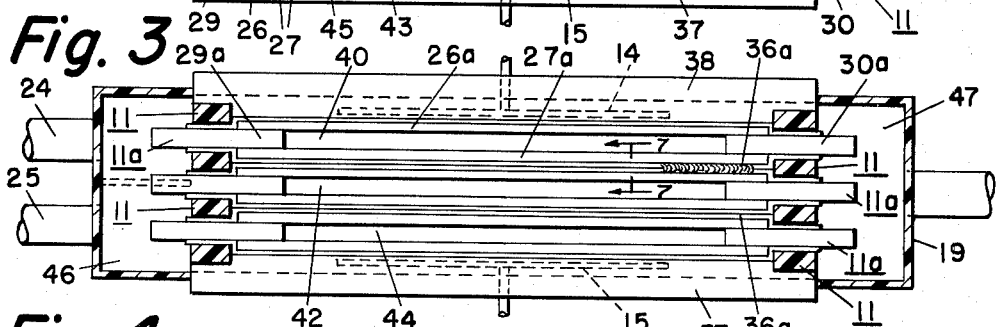
FIG. 3 is a view taken along the plane 3—3 in FIG. 1.
Figure 4:
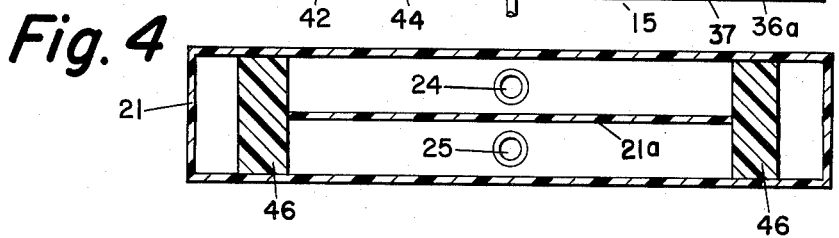
FIG. 4 is a sectional view taken along the plane 4—4 in FIG. 1.

The assembly 10 is provided at the opposite ends thereof with compartments for electrodes 14 and 15, FIGS. 2 and 3. The electrodes are provided with conductors 14a, 15a adapted to extend through cover members 37, 38 and to be connected to a suitable source of direct current voltage, such for example as a battery, not shown. As may be seen in FIG. 1, the multi-cell assembly 10 has been positioned so that it is supported on one corner. This provides for upward flow along an angle of about 45° through each of the cells in the assembly 10 so as to eliminate gas bubbles from the system. Each of the four sides of the assembly 10 is provided with removable manifolds 18–21. In the form of the invention illustrated, the manifold 18 provides an inlet for juice to the assembly 10 and the manifold 20 provides an outlet for the juice after passage through the cell 10. Similarly, the manifold 19 provides an inlet for caustic solution to the assembly 10 and the manifold 21 provides an outlet for the caustic solution from the assembly 10. The outlet manifold 21, FIGS. 1 and 4, is provided with a separator 21a so that the hydrogen and oxygen collected at the opposite electrodes will be separated in the caustic solution outlet as by way of tubes 24 and 25.

Figure 5:
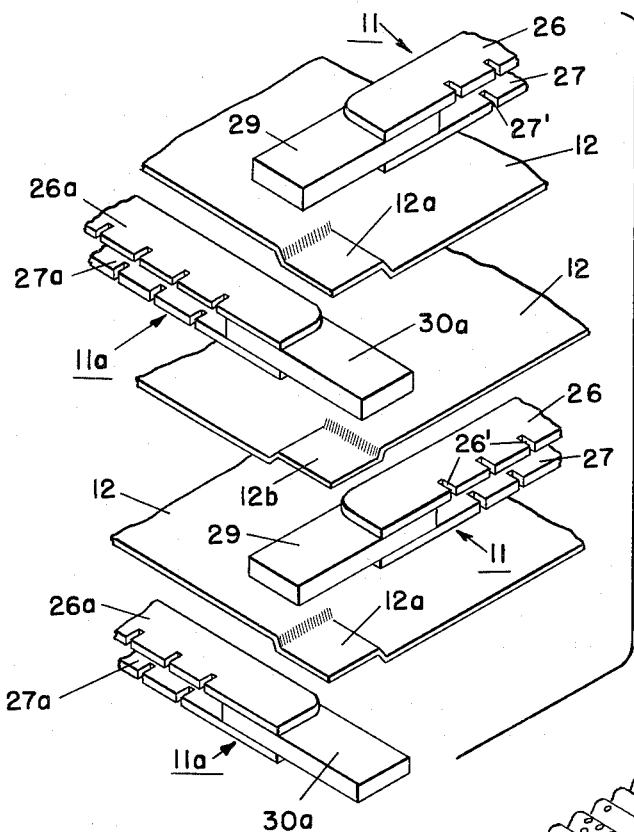
FIGS. 5 and 6 are exploded fractional isometric views showing the assembly relation between adjacent frames and membranes.
Figure 6:
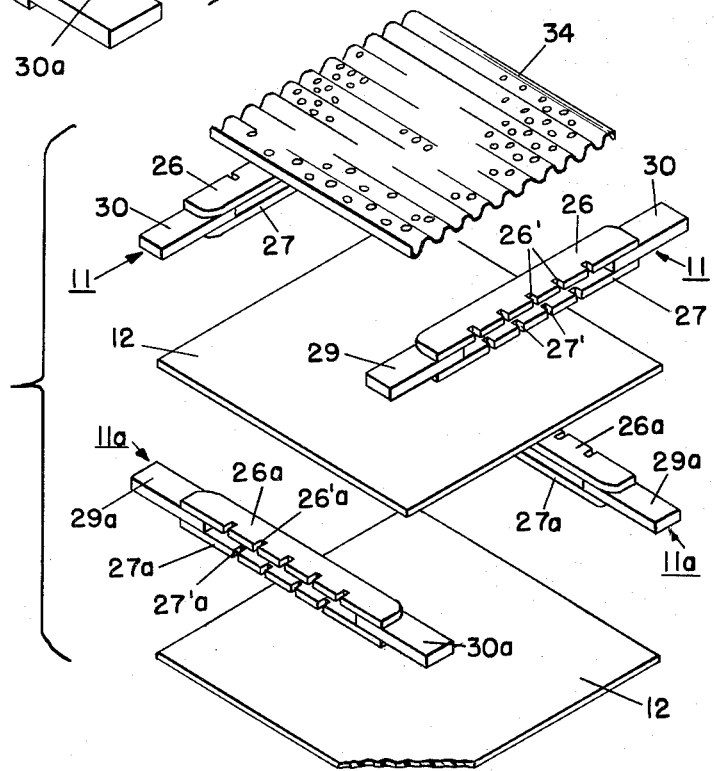

The construction of the frames of the assembly 10 will best be understood by reference to FIGS. 5 and 6. As may be seen in FIG. 6, a frame comprises two pairs of side strips 26, 27 each pair being disposed at opposite sides of the frame. The side strips 26 and 27 in each of the pairs are parallel to each other and are maintained in predetermined spaced relation by spacer members 29 and 30 disposed between and fastened to the ends of each of the pairs of side strips 26 and 27. It is here to be noted that each of the frame sections 11 comprising members 26, 27, 29 and 30 are identical to the other frame sections 11, 11a making up the multi-cell assembly 10. The frame members 26, 27, 29 and 30 are made from a suitable plastic material such as polyethylene or polyvinyl chloride which is easily cleaned, and a non-conductor of electricity and is not subject to corrosion. The frame members of each section may be fastened to each other as by welding, heat sealing or cementing. Additionally, the frame sections may be molded or extruded as integral units.

Each frame in the multi-cell assembly comprises a pair of frame sections as above-mentioned. As may be seen in FIG. 6, a membrane 12 is positioned between the upper pair of frame sections 11 and the lower pair of frame sections 11a which are turned 90° with respect to the upper frame sections. The lower frame sections 11a include pairs of side strips 26a, 27a and spacer members 29a and 30a which are identical to the corresponding members in frame sections 11. While all of the frame sections are identical in this modification, the letter a has been added to the corresponding reference character in the alternate frame sections for clarity in explanation. This will clearly be seen in FIG. 5 where the top frame section has been identified by a reference character 11, the second frame section by reference character 11a, the third frame section by reference character 11 and the bottom frame section by reference character 11a. When the membranes 12 and frame sections 11 and 11a are assembled, the spacer members 29 and 30a will be in alignment with each other and clamp a corner 12a of a membrane 12 therebetween. The spacer members 29 and 30a however are disposed at right angles to each other. Similarly, the spacer member 30a is adapted to cooperate with the spacer member 29 beneath it to clamp a corner 12b of a membrane 12 therebetween. It will also be noted that while the spacer members 29 and 30a, FIG. 5, clamp only a single membrane between them, the side strip members, such as members 27 and 26 of alternate frame sections are adapted to clamp a pair of membranes 12 threebetween.

This construction results due to the fact that the spacer members 29 and 30 are twice the thickness of the individual side strip members 26 and 27. In other words, the thickness of each of the spacer members is equal to the combined thickness of the side strip members 26 and 27. Similarly, the thickness of the individual spacer members 29a and 30a is equal to twice the thickness of the individual side strip members 26a and 27a.

As may be seen in FIG. 6, the openings to each of the cells are defined by the rectangular opening formed by the pair of side strip members 26, 27 and spacer members 29 and 30. In the alternate frames the openings are defined by the rectangular area surrounded by the pair of side strips 26a and 27a and spacer members 29a and 30a. By making the spacers 29, 30 and 29a, 30a twice the thickness of the side strips 26, 27, and 26a, 27a, there is obtained an interlocking and nesting construction whereby the openings, both the inlet and outlet, to each cell are substantially the same thickness and area as the cross-sectional area of each cell. This construction enables each of the cells to be inspected from one end to the other by removing the manifolds 18–21, FIG. 1, at the inlet and outlet ends of the respective sides of the assembly 10.

In order to keep the adjacent membranes 12 out of contact with each other within the unsupported membrane area of the caustic cells 39, 41, 43, 45, there is provided separators 34, FIG. 7, disposed between adjacent membranes 12. The separator 34 is non-conductive and preferably is made from plastic and may be corrugated and perforated or otherwise provided with openings therethrough to permit flow of liquid from one end of each cell to the other. The hydraulic pressure of the juice system is, by means of a flow control device such as a pump and valve arrangement, FIG. 1, maintained at a higher value than that in the caustic system. This keeps the membranes 12 in the juice cells spaced apart without the need of separators. It will, of course, be understood that separators may be used in the juice cells if desired. However, it is preferred that the juice cells be maintained free of mechanical obstruction due to the inclusion in the juice of insoluble particles, such as pulp.

The edges of the membranes 12 when clamped between the corresponding side strips 27, 26 and 27a, 26a, FIG. 5, are adapted to be secured to each other by welding with a polyvinyl chloride rod. It will be noted that the side strips 26, 27 and 26a and 27a are provided with notches 26', 27' and 26'a and 27'a disposed along the respective edges thereof. The notches in members 26 and 26a are off-set a slight amount from the corresponding notches in their cooperating side strips 27 and 27a. Thus when a side strip, such as strip 27a, FIG. 7, is clamped relative to the adjacent side strip 26a, there will be clamped therebetween a pair of membranes 12. By spacing the notches 26′a and 27′a so that they are not in alignment, the clamped edges of the membranes 12 will wedge and extend into the alternately-spaced slots 26′a and 27′a in their respective side strip members 26a and 27a. The exposed edges of the side strips 26a and 27a are then welded together by means of a polyvinyl chloride rod extending therealong and forming a seal along opposite sides of the cell. The other two sides of the cell will constitute the inlet and outlet for the cell. This construction may be more clearly seen in FIGS. 2 and 3.

In FIG. 2, it will be seen that the electrode 14 is disposed in a compartment beneath the cover member 38. A similar compartment for the electrode 15 is provided at the opposite end of the assembly 10 adjacent cover member 37. A flow of caustic is adapted to enter the inlet opening 39 between the upper pair of side strip members 26 and 27 in the top frame section 11. The other side of the compartment for the electrode 14 is formed by a membrane 12 which is clamped between the lower side strip member 27 of the upper frame section 11 and the upper side strip member 26 of the second frame section 11. A second membrane 12 is also clamped between these two side strips and their adjacent edges welded together as by a bead 36. These two membranes are separated at their ends by frame sections 11a, such as shown in FIG. 6, thus providing an inlet and outlet for the juice through the cell or compartment adjacent to the compartment for the electrode 14. Additional cells or compartments are assembled in the multi-cell assembly 10 in similar manner and in any desired number. For example, in one application of the invention 75 similar cells were assembled into a multi-cell assembly, such as assembly 10. In the example illustrated seven cells have been shown. In FIG. 2, the inlets 39, 41, 43 and 45 to the respective compartments of the caustic fluid system have an area corresponding to the cross-sectional area of the respective compartments and such compartments are likewise provided with outlets of corresponding size and shape.

In FIG. 3, the openings 40, 42 and 44 correspond to the inlets to the compartments of the juice fluid system of the multi-cell assembly shown in FIG. 1. These cells have outlet openings of corresponding size and shape to the inlet openings 40, 42 and 44. Again, the inlet and outlet openings for the juice compartments have areas corresponding to the cross-sectional area of the respective compartments. The sides of the caustic compartments are sealed by polyvinyl chloride welds 36a, FIG. 3, which hold the corresponding edges of the adjacent membranes 12 together in manner similar to that shown in FIG. 7. In FIGS. 2 and 3, the welds 36 and 36a are shown fractionally for clarity although in practice they would extend the full length of the cell.

In addition to the welds 36 and 36a on the respective edges of the juice and caustic compartments, the corners of the membranes for each of the compartments are sealed by corner block members 46 and 47 welded or cemented into place at the four corners of the assembly 10. These corner block members 46 and 47 enable the manifolds to be tightly clamped to the multi-cell assembly 10 in avoidance of leakage from the assembly and to permit easy removal of the manifolds for cleaning and inspection. By constructing the various compartments of the assembly from identical integral frame sections assembled in the manner of building blocks, it is a relatively simple matter to assemble such an apparatus with any desired number of cells.

Although the embodiment described above in connection with FIGS. 1–7 is the preferred embodiment, there is a modification of the invention illustrated in FIGS. 8 and 9. In FIG. 8 there is diagrammatically illustrated a multi-cell assembly 50 similar to the assembly 10 illustrated in FIG. 1. In the assembly 50, illustrated in FIG. 8, the electrodes 51 and 52 are disposed within the end compartments which are sealed with covers 53 and 54 respectively. The conductors 51a and 52a respectively extend through openings in the covers 53 and 54. The manifolds for the caustic and the juice systems have been schematically illustrated by the solid line arrows and the broken line arrows, the broken line arrows indicating the outward flow of caustic and juice from the multi-cell assembly 50.

The principal difference in construction between the multi-cell assembly 50 and the assembly 10 of FIG. 1 is the construction of the cell frames. In FIG. 8 it will be seen that each cell frame 55 includes two pairs of side strips 56, 57 which are disposed on opposite sides of the frame 55 and having their ends spaced apart by spacer members 58 and 59. The spacer members 58 and 59 instead of each being divided into two pieces are instead each a single piece which joins the opposite ends of the pairs of side strips 56 and 57. Thus each pair of side strips 56 and 57 has two common spacer members 58 and 59. The opening 60 to the frame 55 is defined by the rectangular area formed by the side strips 56 and 57 and the corresponding ends of the spacer members 58 and 59. Thus the opening 60 to the frame 55 is similar to the rectangular openings to the corresponding frames in the multi-cell assembly 10 previously described.

The alternate frame 55a is similar to frame 55 and includes a pair of side strips 56a and 57a at opposite sides of the frame and spacer members 58a and 59a at the other opposite sides of the frame 55a. As may be seen in FIG. 8, every other frame is similar to frame 55 while the alternate frames are similar to frames 55a. Adjacent frames are separated by membranes 66 thus forming a series of compartments or cells with the alternate openings to the compartments being defined by the openings 60–64 in the cell frames. The openings 60, 62 and 64 are for the caustic whereas the openings 61 and 63 are for the juice. When the multi-cell assembly is clamped together in assembled relation, the membranes 66 will be positioned between the spacer members 58, 59 and 58a and 59a on adjacent frames 55 and 55a and the edges of each pair of membranes will be clamped between the lower side strip members 57 of one frame 55 and the upper side strip members 56 of the alternate frame 55. Similarly, the opposite edges of the membrane 66 are clamped between the respective side strips 57a and 56a in alternate frames 55a. The engaging edges of the adjacent membrane 66 are clamped together and this may be accomplished with the use of notches and by welding, as previously described in connection with the embodiment shown in FIGS. 1–7.

In FIG. 9 there is shown a sectional view of the frames 55 and 55a in assembled relation with respect to a membrane 66. It will be noted that the spacer members 58, 59 and 58a, 59a decrease the effective area of the membrane between adjacent compartments by an amount corresponding to the area of the spacer which extends between the corresponding ends of the side strip members. In order to minimize construction costs the embodiment shown in connection with FIGS. 1–7 is preferred.

It shall be understood that the invention is not limited to the specific arrangements shown, and that changes and modifications may be made within the scope of the appended claims.

What is claimed is:

1. A multi-cell assembly for electrodialysis or the like comprising a plurality of nesting cell frames separated by membranes and arranged to define a central area, each of said frames including two pairs of side strips, said pairs of side strips being disposed on opposite sides of each of said frames, said side strips in each of said pairs being parallel to each other and maintained in predetermined spaced relation by spacer members disposed between the ends of each of said pairs of side strips to define a cell opening, said spacer members in each frame extending outwardly of the ends of the corresponding pairs of said side strips, said pairs of side strips and spacers in each alternate frame in the assembly being in direct alignment and turned through an angle of 90° with respect to each adjacent frame, and each of said spacer members having a thickness twice the thickness of each of said side strips so that when said frames and membranes are assembled said spacers in adjacent frames will clamp a membrane therebetween and said side strips in alternate frames will clamp two membranes therebetween whereby the cell openings to each frame have substantially the same area as the cross-sectional area of each of the cells of said multi-cell assembly.

2. A multi-cell assembly according to claim 1 wherein said spacer members disposed between the ends of each of said pairs of side strips are joined together to form a rectangular frame.

3. A multi-cell assembly according to claim 1 wherein said two pairs of side strips in each frame each have common spacer members disposed between the ends of each of said pairs of side strips.

4. A multi-cell assembly according to claim 1 wherein said spacer members disposed between the ends of each of said pairs of side strips extend in a direction parallel to said side strips.

5. A multi-cell assembly according to claim 1 wherein said spacer members disposed between the ends of each of said pairs of side strips extend outwardly of the ends of the corresponding pairs of said side strips at an angle of 90° with respect to said pairs of side strips.

6. A multi-cell assembly according to claim 1 wherein each said frame includes two spacer members common to said two pairs of side strips.

7. A multi-cell assembly according to claim 1 wherein each said frame includes four spacer members.

8. A multi-cell assembly for electrodialysis or the like comprising a plurality of nesting rectangular cell frames separated by membranes, each of said frames including two pairs of plastic side strips, said pairs of plastic side strips being disposed on opposite sides of each of said frames, said plastic side strips in each of said pairs being parallel to each other and maintained in predetermined spaced relation by plastic spacer members disposed between the ends of each of said pairs of plastic side strips to define a cell opening, said spacer members in each frame extending outwardly of the ends of the corresponding pairs of said side strips, said pairs of plastic side strips and spacers in each alternate frame in the assembly being in direct alignment and turned through an angle of 90° with respect to each adjacent frame, and each of said plastic spacer members having a thickness twice the thickness of each of said side strips so that when said frames and membranes are assembled said spacers in adjacent frames will clamp a membrane therebetween and said plastic side strips in alternate frames will clamp two membranes therebetween whereby the cell openings to each frame have substantially the same area as the cross-sectional area of each of the cells of said multi-cell assembly.

9. A construction unit for building a multi-cell assembly for electrodialysis or the like comprising a plurality of nesting cell frames wherein said construction unit is characterized by a frame section comprising a pair of side strips secured in spaced parallel relation by spacer members disposed between the ends of said pair of side strips to define a cell opening therebetween, said spacer members extending outwardly of the corresponding ends of said side strips, each of said spacer members having a thickness twice the thickness of each of said side strips, and each frame of said multi-cell assembly including a pair of frame sections disposed at opposite sides of the multi-cell assembly with the frame sections in alternate frames being turned through an angle of 90° with respect to said frame sections in each adjacent frame so as to provide alternate cells in said multi-cell assembly with cell openings from alternate sides of said multi-cell assembly.

10. A multi-cell assembly according to claim 1 wherein separator members are provided in alternate cells of the assembly to maintain the membranes in spaced relation one from the other.

11. A multi-cell assembly according to claim 10 wherein said separators are disposed in only said alternate cells.

12. A multi-cell assembly for electrodialysis or the like comprising a plurality of frames separated by membranes to provide a plurality of cells with openings at the opposite ends thereof, a first manifold means to introduce a flow of solution for treatment including insoluble solids through alternate cells of said assembly, a second manifold means for introducing a flow of electrolyte producing ion exchange into the remaining cells of said assembly, and separator means in said cells containing said electrolyte for maintaining said membranes in spaced relation, and means for maintaining said solution to be treated at a hydraulic pressure greater than that of said electrolyte so as to maintain said membranes in said solution cells in spaced relation without restriction to the movement of insoluble solids through the cell.

13. A multi-cell assembly for electrodialysis or the like including: a plurality of nesting cell frames separated by membranes wherein each of said cell frames is constructed from a pair of identical frame sections and each frame section consists of: a pair of side strips, having edges sealed together and having alternately spaced notches to receive the edges of said membranes, and being supported in spaced parallel relation by spacer members disposed between the ends of each pair of said side strips to define a rectangular cell opening between said pair of side strips, the edges of membranes, clamped between said side strips, being sealed together.

References Cited by the Examiner

UNITED STATES PATENTS

| 2,880,501 | 4/1959 | Metz | 204—301 |
|---|---|---|---|
| 2,894,894 | 7/1959 | Kressman et al. | 204—301 |
| 2,990,361 | 6/1961 | Solt | 204—301 |

FOREIGN PATENTS 852,272   10/1960   Great Britain.

WINSTON A. DOUGLAS, *Primary Examiner.*

MURRAY TILLMAN, JOHN H. MACK, JOHN R. SPECK, *Examiners.*